(12) United States Patent
Jeon et al.

(10) Patent No.: US 9,198,167 B2
(45) Date of Patent: Nov. 24, 2015

(54) METHOD OF GENERATING NETWORKS BY UTILIZING MULTI-CHANNEL

(71) Applicant: Electronics and Telecommunications Research Institute, Daejeon (KR)

(72) Inventors: Young Ae Jeon, Daejeon (KR); Sangjae Lee, Daejeon (KR); Sangsung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 198 days.

(21) Appl. No.: 13/938,719

(22) Filed: Jul. 10, 2013

(65) Prior Publication Data

US 2014/0016581 A1    Jan. 16, 2014

(30) Foreign Application Priority Data

Jul. 10, 2012  (KR) .................. 10-2012-0074898
Jul. 1, 2013   (KR) .................. 10-2013-0076698

(51) Int. Cl.
*H04W 4/00*   (2009.01)
*H04W 72/04*  (2009.01)
*H04W 74/08*  (2009.01)
*H04W 84/18*  (2009.01)

(52) U.S. Cl.
CPC .......... *H04W 72/0406* (2013.01); *H04W 74/08* (2013.01); *H04W 84/18* (2013.01); *Y02B 60/50* (2013.01)

(58) Field of Classification Search
None
See application file for complete search history.

(56) References Cited

U.S. PATENT DOCUMENTS

| 7,995,526 | B2 | 8/2011 | Liu et al. |
|---|---|---|---|
| 2006/0007907 | A1 | 1/2006 | Shao et al. |
| 2007/0047510 | A1 | 3/2007 | Cho et al. |
| 2009/0168744 | A1 | 7/2009 | Park |
| 2012/0069869 | A1 | 3/2012 | Jeong et al. |
| 2012/0120892 | A1* | 5/2012 | Freda et al. ........... 370/329 |
| 2013/0231108 | A1* | 9/2013 | Kim et al. ........... 455/434 |

FOREIGN PATENT DOCUMENTS

| JP | 2006-33827 | 2/2006 |
|---|---|---|
| KR | 10-2007-0024995 | 3/2007 |
| KR | 10-2009-0069765 | 7/2009 |
| KR | 10-2010-0121441 | 11/2010 |
| KR | 10-2011-0076259 | 7/2011 |
| KR | 10-2012-0019951 | 3/2012 |

* cited by examiner

*Primary Examiner* — Minh-Trang Nguyen
(74) *Attorney, Agent, or Firm* — Nelson Mullins Riley & Scarborough LLP

(57) ABSTRACT

A method of generating networks by utilizing a multi-channel so that channels may be efficiently used, inter-channel interference may be avoided, and a network may be energy efficiently managed is provided. Through a super personal area network (PAN) coordinator that manages all networks based on a multi-channel, a PAN capable of avoiding inter-channel interference may be formed. In addition, it is possible to grasp use states of channels used for transmitting and receiving beacon frames, to observe a change in a network topology, and to form an energy efficient PAN.

16 Claims, 15 Drawing Sheets

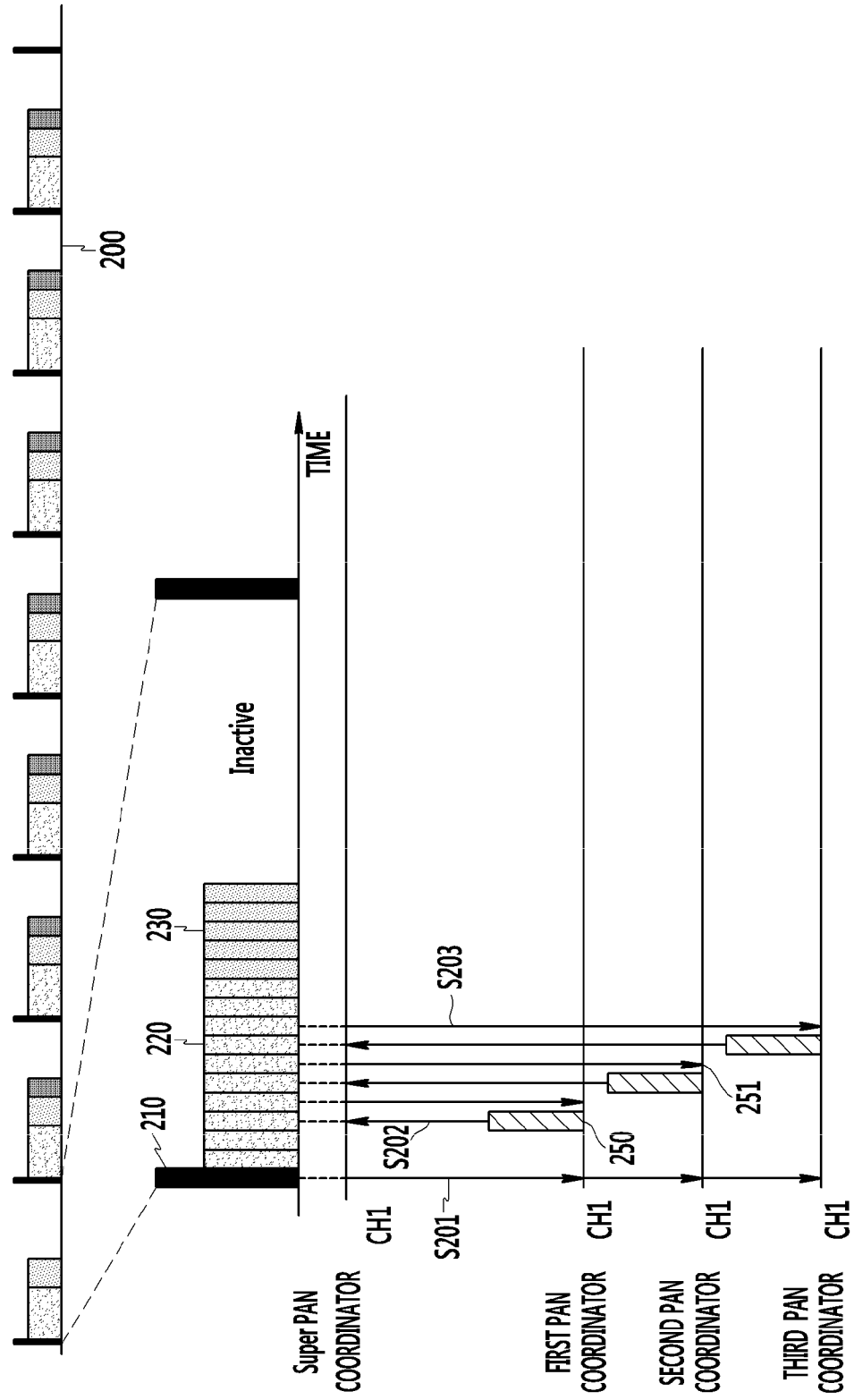

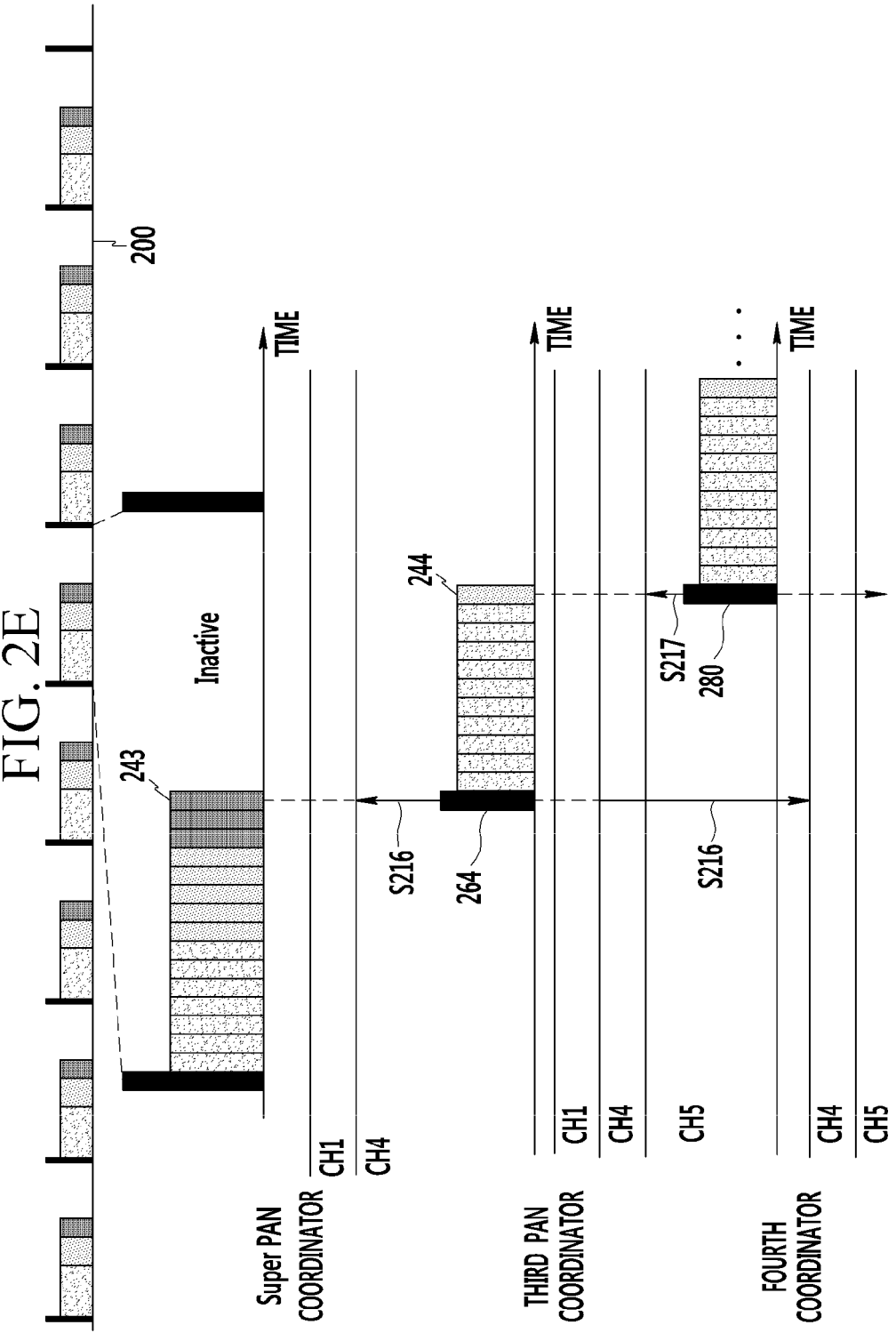

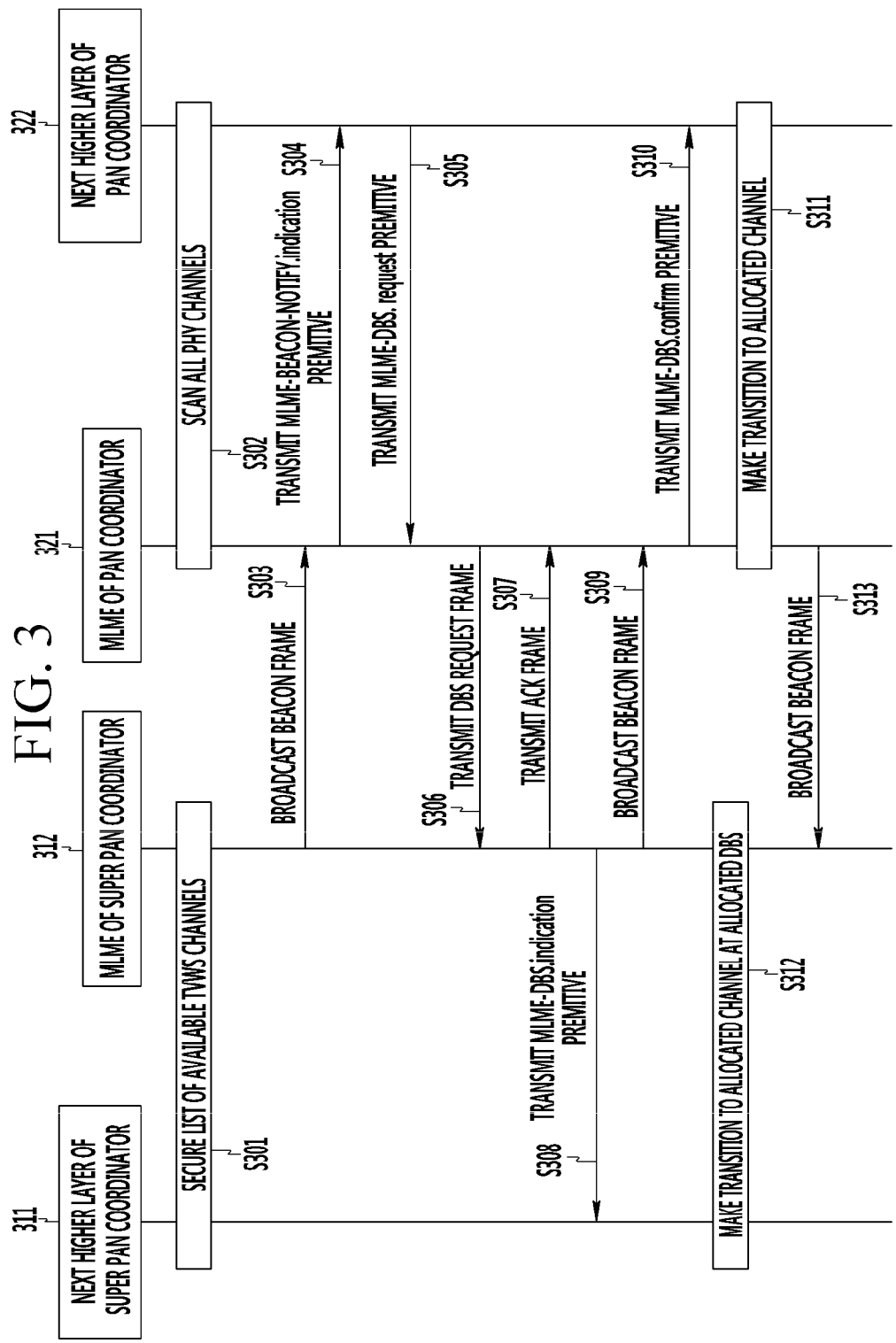

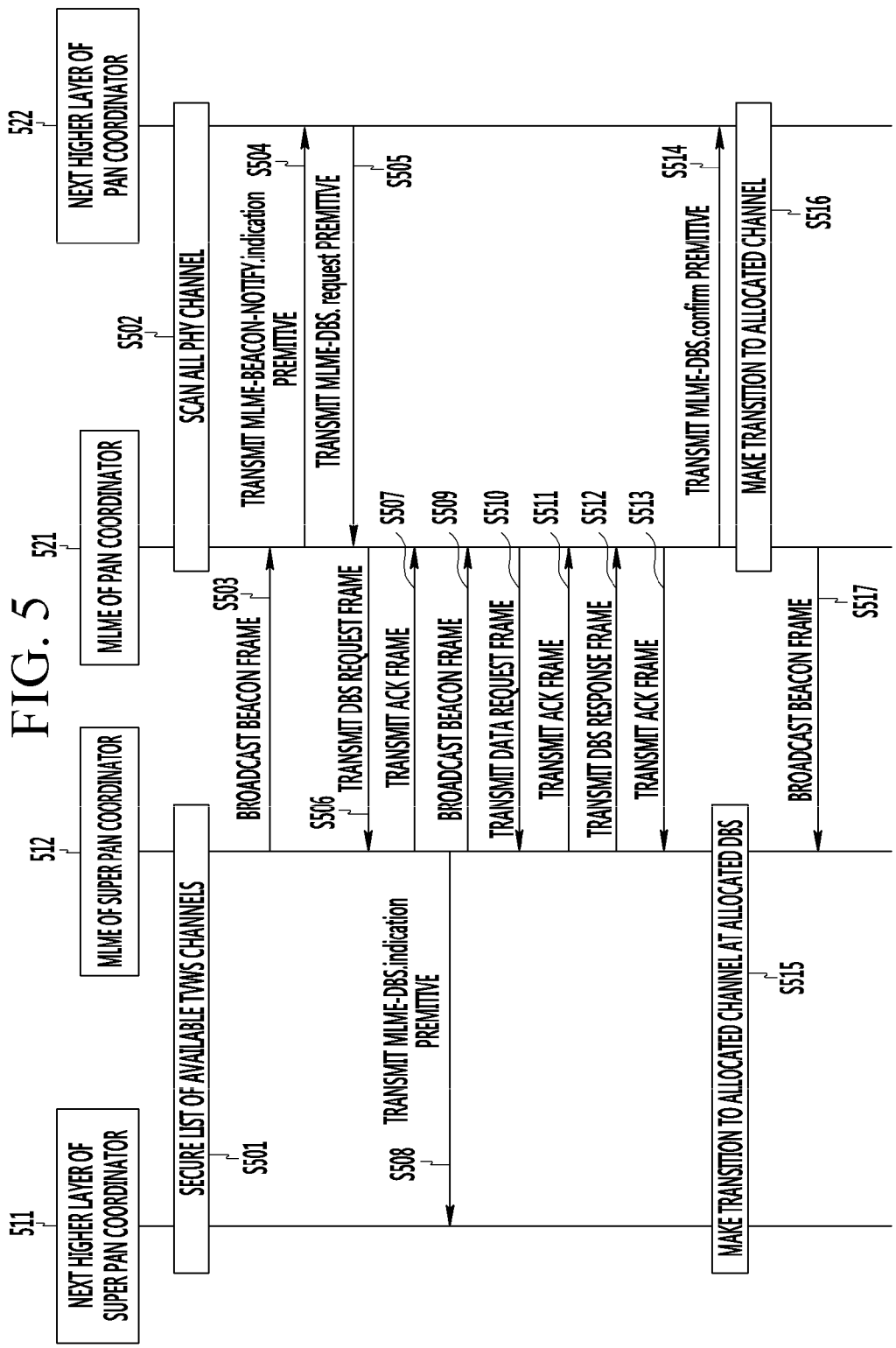

METHOD OF GENERATING NETWORKS BY UTILIZING MULTI-CHANNEL

CROSS-REFERENCE TO RELATED APPLICATION

This application claims priority to and the benefit of Korean Patent Application No. 10-2012-0074898 and 10-2013-0076698 filed in the Korean Intellectual Property Office on Jul. 10, 2012 and Jul. 1, 2013, the entire contents of which are incorporated herein by reference.

BACKGROUND OF THE INVENTION (a) Field of the Invention

The present invention relates to a method of generating networks by utilizing a multi-channel in a multi-hop-based low speed personal wireless communication network.

The present invention is drawn from research performed as part of an IT new growth engine core technology development project of the Ministry of Knowledge Economy [Task Management Number: 10035236, Task Title: Development of a Wireless Transmission Technology for Smart Utility Networks].

(b) Description of the Related Art

Standardization of a wireless personal area network (WPAN) that utilizes a TV white space (TVWS) is performed in IEEE 802.15.4m. On September 2010, access to the TVWS was allowed by the U.S. Federal Communications Commission (FCC) based on a database without sensing a spectrum so that a discussion of utilization of the WPAN technology in the TVWS was started.

The WPAN technology utilizing the TVWS may replace ZigBee in which interference is generated in a 2.4 GHz industrial, scientific, and medical (ISM) band by sharing a frequency with wireless-fidelity (Wi-Fi). In order for the WPAN technology utilizing the TVWS to stably transmit and receive utility information such as electricity, gas, and water supply in the 2.4 GHz ISM band without generating interference with other specifications, a state of an entire topology is grasped and networks are independently formed in utilities, respectively, so that use efficiency of a channel is improved.

However, in a conventional network where a personal area network (PAN) coordinator is used for a single channel, although a technique of extending a cluster is used, it is difficult to maintain entire network synchronization and a message may be delayed. In addition, it is difficult to form an independent PAN capable of avoiding inter-channel interference.

SUMMARY OF THE INVENTION

According to an exemplary embodiment of the present invention, a method of generating networks by utilizing a multi-channel so that a channel may be efficiently used, inter-channel interference may be avoided, and energy efficient networks may be formed is provided.

According to one aspect of the present invention, a method of generating networks by a PAN coordinator of a wireless personal area network (WPAN) is provided. The network generating method includes securing a plurality of channels included in an available TV white space (TVWS), mapping one of the plurality of channels to a physical (PHY) channel and broadcasting a first beacon frame through the PHY channel, receiving a request frame for requesting allocation of a channel and a dedicated beacon slot (DBS) from at least one PAN coordinator among a plurality of PAN coordinators that receive the first beacon frame, allocating a first channel and a first DBS to a first PAN coordinator among PAN coordinators that transmit the request frame, and receiving a second beacon frame from the first PAN coordinator at the first DBS through the first channel.

Allocating a first channel and a first DBS to a first PAN coordinator may include broadcasting a third beacon frame including information on the first channel and the first DBS allocated to the first PAN coordinator.

Allocating a first channel and a first DBS to a first PAN coordinator may include receiving a data request frame from the first PAN coordinator and transmitting a DBS response frame including the information on the first channel and the first DBS to the first PAN coordinator.

The network generating method may further include transmitting an acknowledge (ACK) frame to the first PAN coordinator after receiving the request frame.

The PAN coordinator may be a TVWS multi-channel cluster tree PAN (TMCTP)-parent coordinator, and the first PAN coordinator may be a TMCTP-child coordinator.

The network generating method may further include a media access control (MAC) layer management entity (MLME) of the PAN coordinator transmitting an MLME-DBS.indication primitive to a next higher layer of the PAN coordinator after receiving the request frame.

According to another exemplary embodiment of the present invention, another method of generating networks by PAN coordinators of a WPAN is provided. The network generating method includes receiving a first beacon frame broadcasted by a first PAN coordinator through a PHY channel to which one of channels of an available TVWS is mapped, transmitting a request frame for requesting allocation of a channel and a DBS to the first PAN coordinator, receiving the first channel and the first DBS from the first PAN coordinator, and broadcasting a second beacon frame at the first DBS through the first channel.

Receiving the first channel and the first DBS from the first PAN coordinator may include receiving a third beacon frame including information on the first channel and the first DBS allocated to the PAN coordinator from the first PAN coordinator.

Receiving the first channel and the first DBS from the first PAN coordinator may include transmitting a data request frame to the first PAN coordinator and receiving a DBS response frame including the information on the first channel and the first DBS from the first PAN coordinator.

The network generating method may further include receiving an ACK frame from the first PAN coordinator after transmitting the request frame.

The first PAN coordinator may be a TMCTP-parent coordinator and the PAN coordinator may be a TMCTP-child coordinator.

The network generating method may further include an MLME of the PAN coordinator transmitting an MLME-BEACON-NOTIFY.indication primitive to a next higher layer of the PAN coordinator after receiving the first beacon frame.

The network generating method may further include the next higher layer of the PAN coordinator analyzing the MLME-BEACON-NOTIFY.indication primitive and transmitting an MLME-DBS.request primitive to the MLME of the PAN coordinator.

Broadcasting the second beacon frame may include making a transition to the first channel in the first DBS and broadcasting the second beacon frame at the first DBS through the first channel.

The network generating method may further include an MLME of the PAN coordinator analyzing the third beacon frame to confirm the information on the first channel, and the first DBS and transmitting an MLME-DBS.confirm primitive to a next higher layer of the PAN coordinator after receiving the third beacon frame.

The network generating method may further include an MLME of the PAN coordinator analyzing the DBS response frame to confirm the information on the first channel and the first DBS, and transmitting an MLME-DBS.confirm primitive to a next higher layer of the PAN coordinator after receiving the DBS response frame.

According to another exemplary embodiment of the present invention, another method of generating networks by PAN coordinators of a WPAN is provided.

The network generating method includes receiving a first channel and a first DBS from a first PAN coordinator, broadcasting a first beacon frame at the first DBS through the first channel, receiving a request frame for requesting allocation of a channel and a DBS from a second PAN coordinator that receives the first beacon frame, delaying the request frame to the first coordinator, receiving information on a second channel allocated to the second PAN coordinator from the first PAN coordinator, allocating the second DBS and the second channel to the second coordinator, and receiving a second beacon frame from the second PAN coordinator at the second DBS through the second channel.

Delaying the request frame may include broadcasting a third beacon frame including information on the request frame, and receiving the information on the second channel may include receiving a fourth beacon frame including the information on the second channel.

Receiving the information on the second channel may include receiving a DBS response frame including the information on the second channel.

The network generating method may further include transmitting an ACK frame to the second PAN coordinator after receiving the request frame.

The first PAN coordinator may be a TMCTP-parent coordinator and the PAN coordinator and the second PAN coordinator may be TMCTP-child coordinators.

According to the exemplary embodiments of the present invention, through the super PAN coordinator that manages all networks based on a multi-channel, a PAN capable of avoiding inter-channel interference may be formed. In addition, it is possible to grasp use states of channels used for transmitting and receiving beacon frames, to observe a change in a network topology, and to form an energy efficient PAN.

BRIEF DESCRIPTION OF THE DRAWINGS

FIGS. 2A, 2B, 2C, 2D and 2E are view illustrating processes of generating a multi-channel cluster tree network according to an exemplary embodiment of the present invention, respectively.

FIG. 3 is a flowchart illustrating messages transmitted and received by PAN coordinators, respectively, when a multi-channel cluster tree network according to an exemplary embodiment of the present invention is generated.

FIG. 5 is a flowchart illustrating a message transmitted and received by PAN coordinators, respectively, when a multi-channel cluster tree network according to another exemplary embodiment of the present invention is generated.

DETAILED DESCRIPTION OF THE EMBODIMENTS

Figure 1:
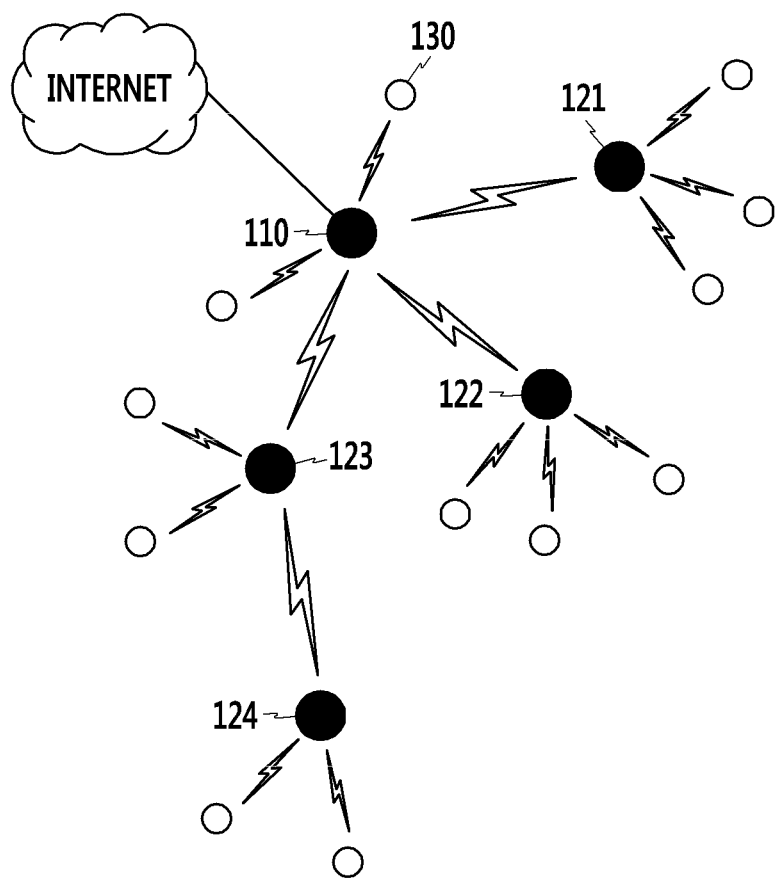
FIG. 1 is a view illustrating a network topology according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "•••unit", "•••er", "module", and "block" written in the specification mean units for performing at least one function or operation, which may be realized by hardware, software, or a combination of hardware and software.

FIG. 1 is a view illustrating a network topology according to an exemplary embodiment of the present invention.

Referring to FIG. 1, a network according to the exemplary embodiment of the present invention includes a super personal area network (PAN) coordinator 110, a plurality of PAN coordinators 121 to 124, and a plurality of end devices 130. In the exemplary embodiment of the present invention, the super PAN coordinator 110, the plurality of PAN coordinators 121 to 124, and the plurality of end devices 130 may be connected to the Internet to obtain available TV channel information from a geo-location database (GDB).

The super PAN coordinator 110 obtains the available TV channel information to map the obtained available TV channel information to wireless personal area network (WPAN) physical (PHY) channels and may allocate the WPAN PHY channels to the plurality of PAN coordinators 121 to 123.

In the plurality of PAN coordinators 121 to 124, the PAN coordinators 121 to 123 may directly receive a beacon frame from the super PAN coordinator to receive a channel and a beacon slot, and the PAN coordinator 124 may receive the channel and the beacon slot from the super PAN coordinator via the other PAN coordinators. That is, a specific PAN coordinator 123 may allocate a channel to another PAN coordinator 124 instead of the super PAN coordinator.

That is, according to the exemplary embodiment of the present invention, the super PAN coordinator secures a channel of an available TV white space (TVWS) obtained through the Internet, maps the channel of the TVWS to the WPAN PHY channels, and allocates the WPAN PHY channels to the plurality of PAN coordinators so that TVWS multi-channel cluster tree PANs (TMCTP) may be generated. End equipment may associate with a PAN through an adjacent PAN coordinator.

According to the exemplary embodiment of the present invention, the super PAN coordinator may be referred to as a TMCTP-parent coordinator, and the plurality of PAN coordinators may be referred to as TMCTP-parent coordinators or TMCTP-child coordinators.

FIGS. 2A, 2B, 2C, 2D and 2E are view illustrating processes of generating a multi-channel cluster tree network according to an exemplary embodiment of the present invention, respectively.

A super frame 200 illustrated in an upper part of FIG. 2 represents a super frame of the super PAN coordinator. The super frame 200 of the super PAN coordinator includes a beacon frame 210, a contention access period (CAP) 220, and a contention-free period (CFP) 230.

Referring to FIG. 2A, first, the super PAN coordinator 110 obtains an available TVWS from a GDB through the Internet, maps the obtained TVWS to WPAN PHY channels, and selects one (a channel 1) of the WPAN PHY channels to broadcast the beacon frame 210. At this time, the beacon frame 210 includes a TMCTP specification information entity (IE) that provides information such as dedicated beacon slot allocation capability and channel allocation capability.

Then, the first, second, and third PAN coordinators 121 to 123 receive the beacon frame 210 from the super PAN coordinator 110 through the channel 1 (S201).

The first, second, and third PAN coordinators 121 to 123 then transmit a guaranteed time slot (GTS) request command frame 250 to the super PAN coordinator 110 through the channel 1 in CAPs (S202).

At this time, the first, second, and third PAN coordinators 121 to 123 request allocation of channels and GTSs using the GTS request command frame. The first, second, and third PAN coordinators 121 to 123 transmit the beacon frame at the allocated GTSs through the allocated channels to manage PANs thereof. That is, according to the exemplary embodiment of the present invention, the GTS may be used as a dedicated beacon slot (DBS). Therefore, the GTS request command frame transmitted by the first, second, and third PAN coordinators 121 to 123 to the super PAN coordinator 110 may be a DBS request command frame.

Then, when the super PAN coordinator 110 confirms that an acknowledge request (AR) field included in the DBS request command frame transmitted by the first, second, and third PAN coordinators 121 to 123 is 1, an acknowledge (ACK) frame 251 is transmitted to the plurality of PAN coordinators, respectively (S203).

Figure 2B:
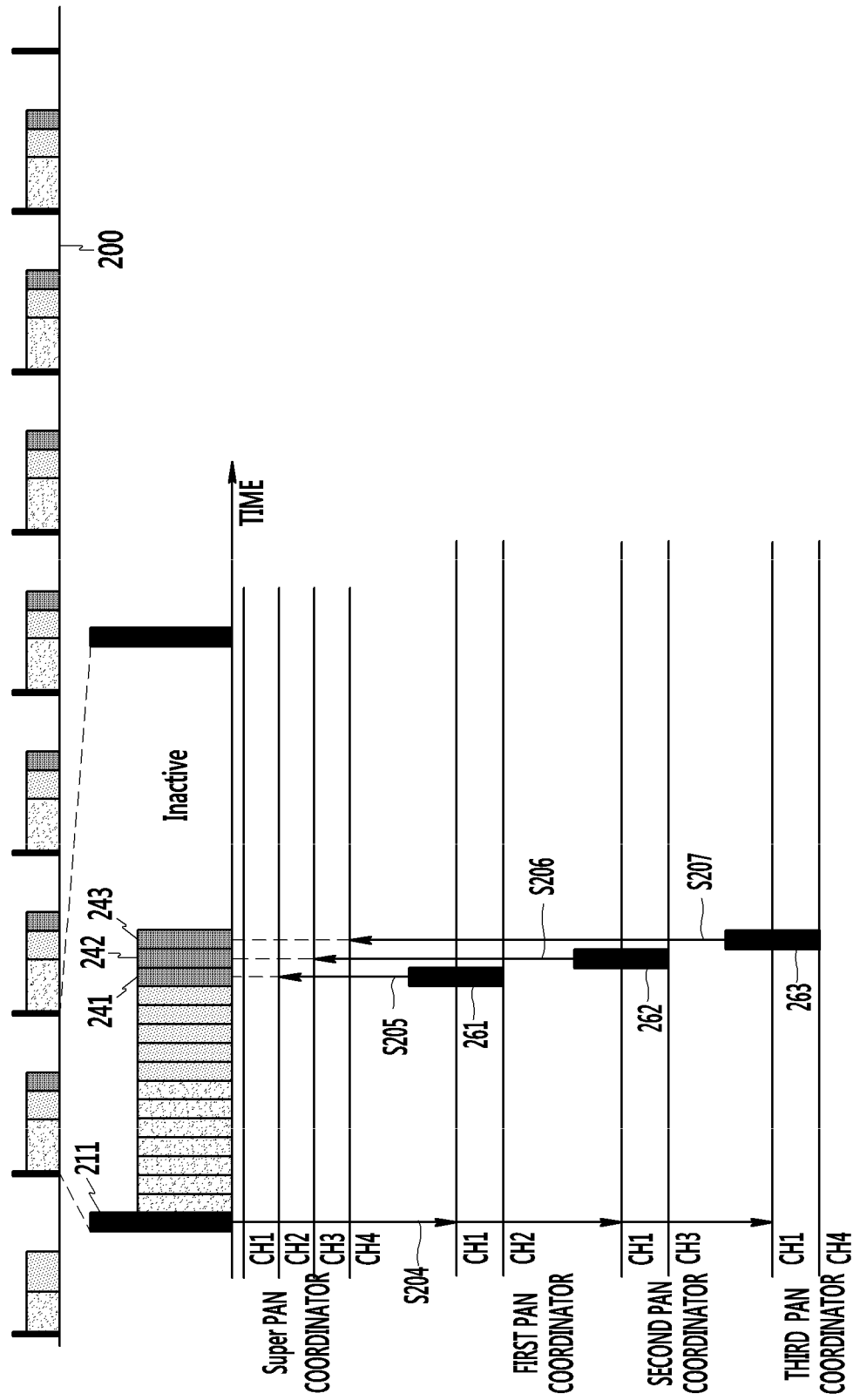

Referring to FIG. 2B, next, in a beacon interval (BI), the first, second, and third PAN coordinators 121 to 123 make a transition to the channel 1 and the super PAN coordinator 110 broadcasts a beacon frame 211 (S204).

At this time, the beacon frame 211 may include information on the channels and DBSs allocated to the first, second, and third PAN coordinators 121 to 123. In this case, the first, second, and third PAN coordinators 121 to 123 receive the beacon frame 211 from the super PAN coordinator 110 to grasp the allocated channels and DBSs.

In the exemplary embodiment of the present invention, the super PAN coordinator 110 may allocate a channel 2 and a DBS 1 241 to the first PAN coordinator 121, may allocate a channel 3 and a DBS 2 242 to the second PAN coordinator 122, and may allocate a channel 4 and a DBS 3 243 to the third PAN coordinator 123.

At this time, in the exemplary embodiment of the present invention, the DBS 1 241 may be a slot immediately next to a CFP 230, the DBS 2 242 may be a slot immediately next to the DBS 1 241, and the DBS 3 243 may be a slot immediately next to the DBS 2 242. Therefore, the DBSs 241 to 243 to which the respective PAN coordinators transmit beacons are positioned next to the CFP 230 of the super PAN coordinator 110, and a cluster of the DBSs 241 to 243 may be a beacon only period (BOP) 240 used by the respective PAN coordinators for transmitting the beacons. In the super frame according to the exemplary embodiment of the present invention, the BOP 240 may be positioned between the CFP 230 and an inactive period.

In FIG. 2B, at the DBS 1 241, the super PAN coordinator 110 and the first PAN coordinator 121 make a transition from the channel 1 to the channel 2 and the first PAN coordinator 121 transmits a beacon 261 thereof through the channel 2 and may manage a PAN thereof (S205).

Next, at the DBS 2 242, the super PAN coordinator 110 makes a transmission from the channel 2 to the channel 3 and the second PAN coordinator 122 makes a transition from the channel 1 to the channel 3, and at the DBS 2 242, the second PAN coordinator 122 transmits a beacon 262 thereof through the channel 3 and may manage a PAN thereof (S206).

Next, at the DBS 3 243, the super PAN coordinator 110 makes a transition from the channel 3 to the channel 4, and the third PAN coordinator 123 makes a transition from the channel 1 to the channel 4, transmits a beacon 263 thereof through the channel 4, and may manage a PAN thereof (S207).

Next, after the DBS 3 243, the super PAN coordinator 110 makes a transition from the channel 4 to the channel 1.

Figure 2C:
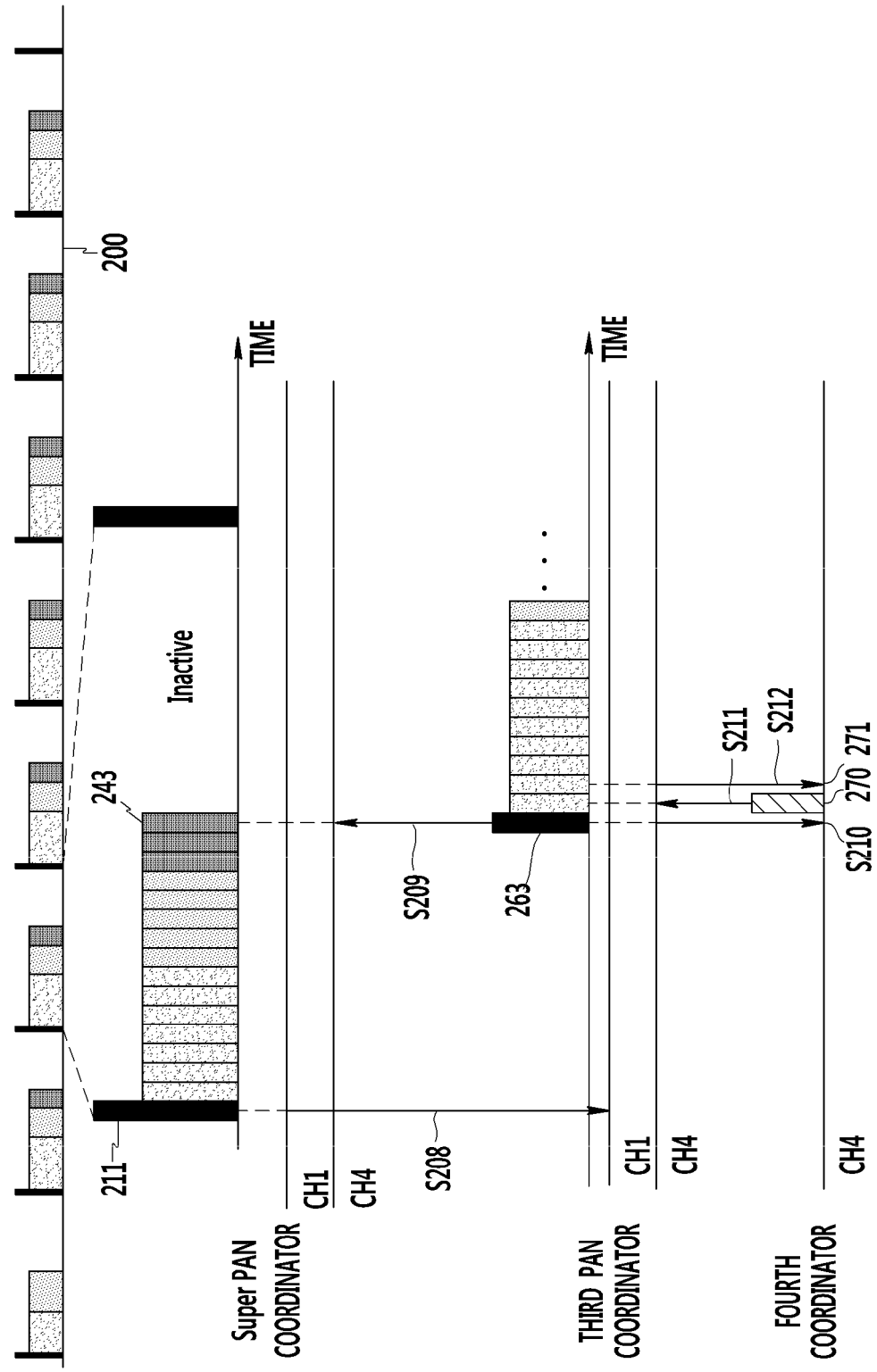

In FIG. 2C, before the next beacon frame 211 is broadcast, the first, second, and third PAN coordinators 121 to 123 make a transition to the channel 1. Then, the super PAN coordinator 110 broadcasts the beacon frame 211 through the channel 1 (S208), and the first, second, and third PAN coordinators 121 to 123 receive the beacon frame 211 through the channel 1. Since the first and second PAN coordinators 121 and 122 repeat operations of broadcasting beacons at the DBSs allocated thereto as illustrated in FIG. 2B, the first and second PAN coordinators 121 and 122 are not illustrated in FIG. 2C to FIG. 2E.

At the DBS 3 243, the third PAN coordinator 123 makes a transition from the channel 1 to the channel 4 to broadcast a beacon frame 263 thereof (S209). At this time, a fourth PAN coordinator 124 that newly associates with the network receives the beacon frame 263 through the channel 4 (S210).

Then, the fourth PAN coordinator 124 transmits a DBS request command frame 270 to the third PAN coordinator 123 through the channel 4 in the CAP of the third PAN coordinator 123 S211 to request allocation of a channel and a DBS. The third PAN coordinator 123 that receives the DBS request command frame 270 of the fourth PAN coordinator 124 transmits an ACK frame 271 to the fourth PAN coordinator 124 (S212).

Figure 2D:
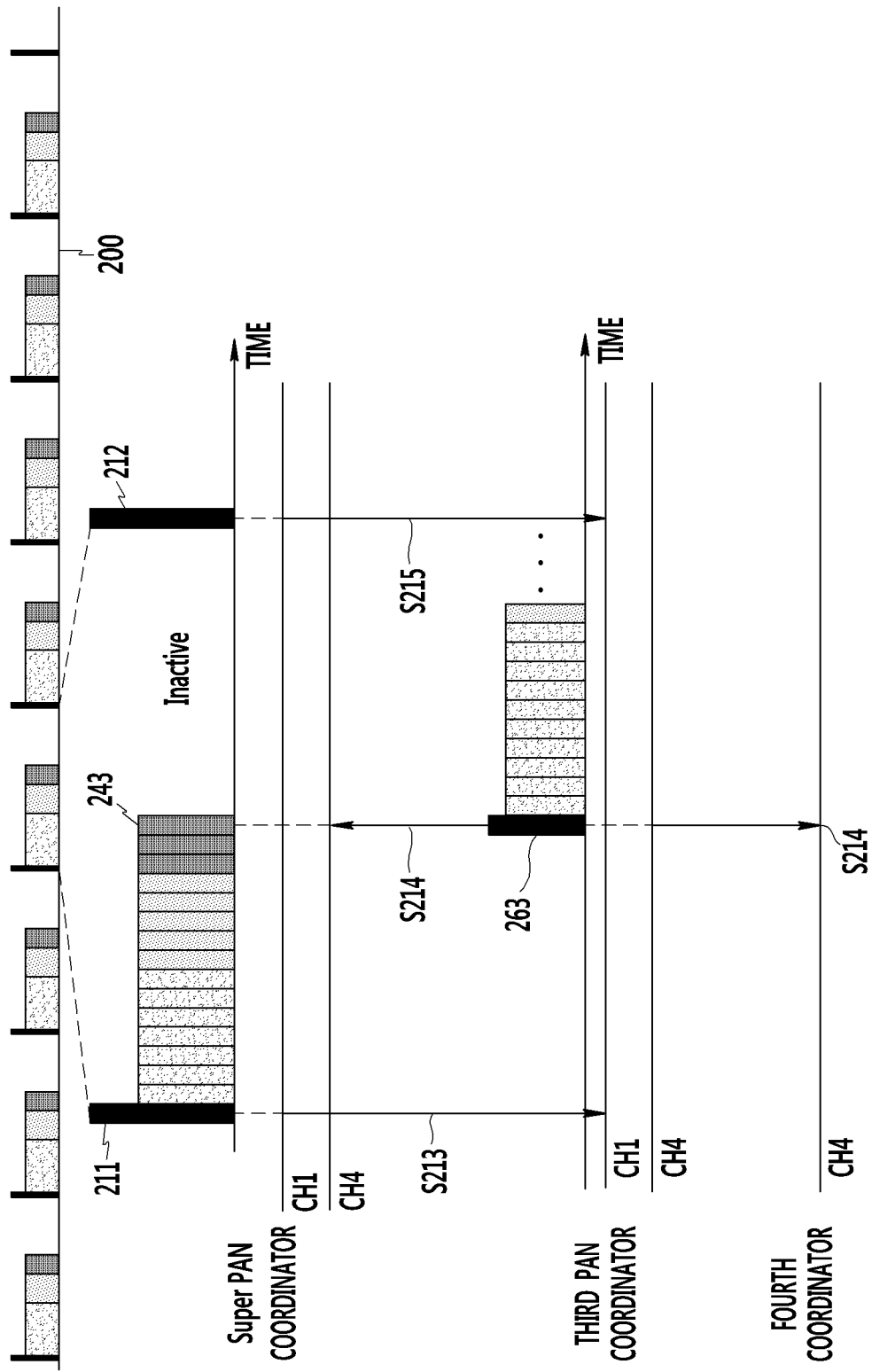

In FIG. 2D, at a next BI, the super PAN coordinator 110 broadcasts the beacon frame 211 through the channel 1 and the third PAN coordinator 123 receives the beacon frame 211 of the super PAN coordinator 110 through the channel 1 (S213).

At the DBS 3 243, the third PAN coordinator 123 broadcasts the beacon frame 263 thereof through the channel 4, and the fourth PAN coordinator 124 and the super PAN coordinator 110 may receive the beacon frame 263 of the third PAN coordinator 123 through the channel 4 (S214). At this time, the super PAN coordinator 110 may grasp the request to allocate the channel and the DBS of the fourth PAN coordinator 124 through the beacon frame 263 of the third PAN coordinator 123.

Then, at a next BI, the super PAN coordinator 110 includes information on the channels and DBSs allocated to the first, second, and third PAN coordinators and information on the channel allocated to the fourth PAN coordinator in a beacon frame 212 thereof, and broadcasts the information items through the channel 1 (S215). At this time, the third PAN coordinator 123 recognizes the information on the channel allocated to the fourth PAN coordinator 124 from the beacon frame 212 received from the super PAN coordinator 110 and determines a DBS to be allocated to the fourth PAN coordinator.

Referring to FIG. 2E, the third PAN coordinator 123 broadcasts a beacon frame 264 including the information on the channel and DBS allocated to the fourth PAN coordinator 124 through the channel 4 at the DBS 3 243 (S216). In the exemplary embodiment of the present invention, a channel 5 and a DBS 244 of the third PAN coordinator 123 may be allocated to the fourth PAN coordinator 124.

Then, the fourth PAN coordinator 124 receives the beacon frame 264 of the third PAN coordinator 123 through the channel 4, and transmits a beacon frame 280 thereof through the channel 5 at the DBS 244 (S217) and may manage a PAN thereof.

FIG. 3 is a flowchart illustrating messages transmitted and received by PAN coordinators, respectively, when a multi-channel cluster tree network according to an exemplary embodiment of the present invention is generated.

First, the super PAN coordinator secures a list of available TVWS channels from a GDB through the Internet (S301). Then, the super PAN coordinator maps the available TVWS channels to the WPAN PHY channels and selects one of the WPAN PHY channels.

On the other hand, PAN coordinators scan all the WPAN PHY channels to be prepared to receive beacon frames (S302).

Then, a media access control (MAC) layer management entity (MLME) 312 of the super PAN coordinator broadcasts a beacon frame of the super PAN coordinator to a selected WPAN PHY channel (S303).

A MLME 321 of a PAN coordinator that receives the beacon frame of the super PAN coordinator transmits an MLME-BEACON-NOTIFY.indication primitive to a next higher layer 322 of the PAN coordinator (S304).

The next higher layer 322 of the PAN coordinator analyzes the MLME-BEACON-NOTIFY.indication primitive and transmits an MLME-DBS.request primitive to the MLME 321 thereof (S305).

Then, the MLME 321 of the PAN coordinator transmits a DBS request frame including channel allocation request and DBS request information to the super PAN coordinator (S306).

Next, the MLME 312 of the super PAN coordinator transmits an ACK frame for a DBS request frame to the PAN coordinator (S307). The MLME 312 of the super PAN coordinator then transmits an MLME-DBS.indication primitive to a next higher layer 311 of the super PAN coordinator (S308).

Then, the MLME 312 of the super PAN coordinator transmits a beacon frame including channel and DBS allocation information to the PAN coordinator (S309).

The MLME 321 of the PAN coordinator analyzes the beacon frame of the super PAN coordinator to confirm information on an allocated channel and an allocated DBS, and transmits an MLME-DBS.confirm primitive to the next higher layer 322 of the PAN coordinator (S310).

In the next higher layer 322 of the PAN coordinator, a transition is made to the allocated channel at the allocated DBS (S311) and the super PAN coordinator makes a transition to the allocated channel at the allocated DBS to be prepared to receive the beacon frame transmitted by the PAN coordinator (S312).

Then, the PAN coordinator broadcasts the beacon frame thereof at the allocated DBS through the allocated channel (S313), and may manage a PAN thereof.

FIGS. 4A, 4B, 4C, 4D and 4E are view illustrating processes of generating a multi-channel cluster tree network according to another exemplary embodiment of the present invention, respectively.

Figure 4A:
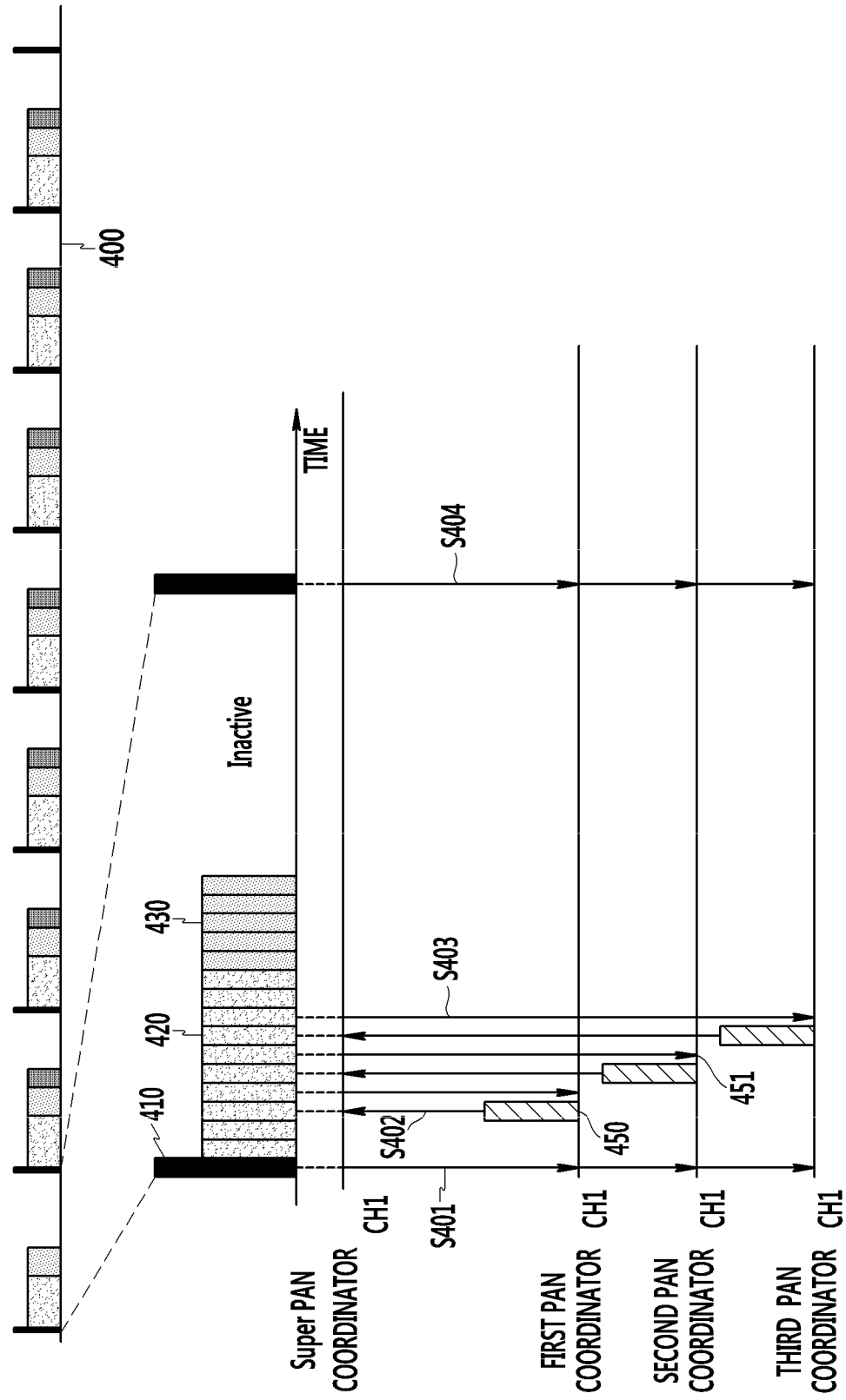
FIGS. 4A, 4B, 4C, 4D and 4E are view illustrating processes of generating a multi-channel cluster tree network according to another exemplary embodiment of the present invention, respectively.

Referring to FIG. 4A, first, the super PAN coordinator 110 obtains an available TVWS from a GDB through the Internet, maps the obtained TVWS to WPAN PHY channels, and selects one (a channel 1) of the WPAN PHY channels to broadcast a beacon frame 410 through the selected PHY channel. At this time, the beacon frame 410 may include TMCTP specification information entity (IE) that provides information such as dedicated beacon slot allocation capability and channel allocation capability.

Then, the first, second, and third PAN coordinators 121 to 123 receive the beacon frame 410 from the super PAN coordinator 110 through the channel 1 (S401).

Then, the first, second, and third PAN coordinators 121 to 123 transmit a DBS request command frame 450 to the super PAN coordinator 110 through the channel 1 in a CAP of the super PAN coordinator 110 (S402).

Then, when the super PAN coordinator 110 confirms that an AR field included in the DBS request command frame transmitted by the first, second, and third PAN coordinators 121 to 123 is 1, an ACK frame 451 is transmitted to a plurality of PAN coordinators (S403)

Next, before the beacon frame is broadcast, the first, second, and third PAN coordinators 121 to 123 make a transition to the channel 1 and the super PAN coordinator 110 broadcasts the beacon frame at a next BI (S404).

At this time, the beacon frame 211 may include the TMCTP specification IE informing that a DBS response frame is prepared such as TMCTP frame pending information, number of PAN IDs pending information, and PAN ID list information. In this case, the first, second, and third PAN coordinators 121 to 123 transmit a data request frame, and the DBS response frame to the super PAN coordinator 110 and receive the data request frame and the DBS response frame from the super PAN coordinator 110 to grasp the allocated channel and DBS.

That is, in the CAP of the super PAN coordinator 110, the first, second, and third PAN coordinators 121 to 123 included in a PAN ID list transmit a data request frame 460 to the super PAN coordinator 110 (S405).

Then, the super PAN coordinator 110 transmits a DBS response frame 461 to the first, second, and third PAN coordinators 121 to 123 that transmit the data request frame 460 S406. At this time, the DBS response frame 461 includes information on a channel and a DBS allocated to the first, second, or third PAN coordinator 121, 122, or 123.

In the exemplary embodiment of the present invention, the super PAN coordinator 110 may allocate a channel 2 and a DBS 1 441 to the first PAN coordinator 121, may allocate a channel 3 and a DBS 2 442 to the second PAN coordinator 122, and may allocate a channel 4 and a DBS 3 443 to the third PAN coordinator 123.

At this time, in the exemplary embodiment of the present invention, the DBS 1 441 may be a slot immediately next to a CFP 430, the DBS 2 442 may be a slot immediately next to the DBS 1 441, and the DBS 3 443 may be a slot immediately next to the DBS 2 442. Therefore, the DBSs 441 to 443 to which the respective PAN coordinators transmit beacons are positioned next to the CFP 430 of the super PAN coordinator 110 and a cluster of the DBSs 441 to 443 may be a beacon only period (BOP) 440 used by the respective PAN coordinators for transmitting the beacons. In the super frame according to the exemplary embodiment of the present invention, the BOP 440 may be positioned between the CFP 430 and an inactive period.

Figure 4B:
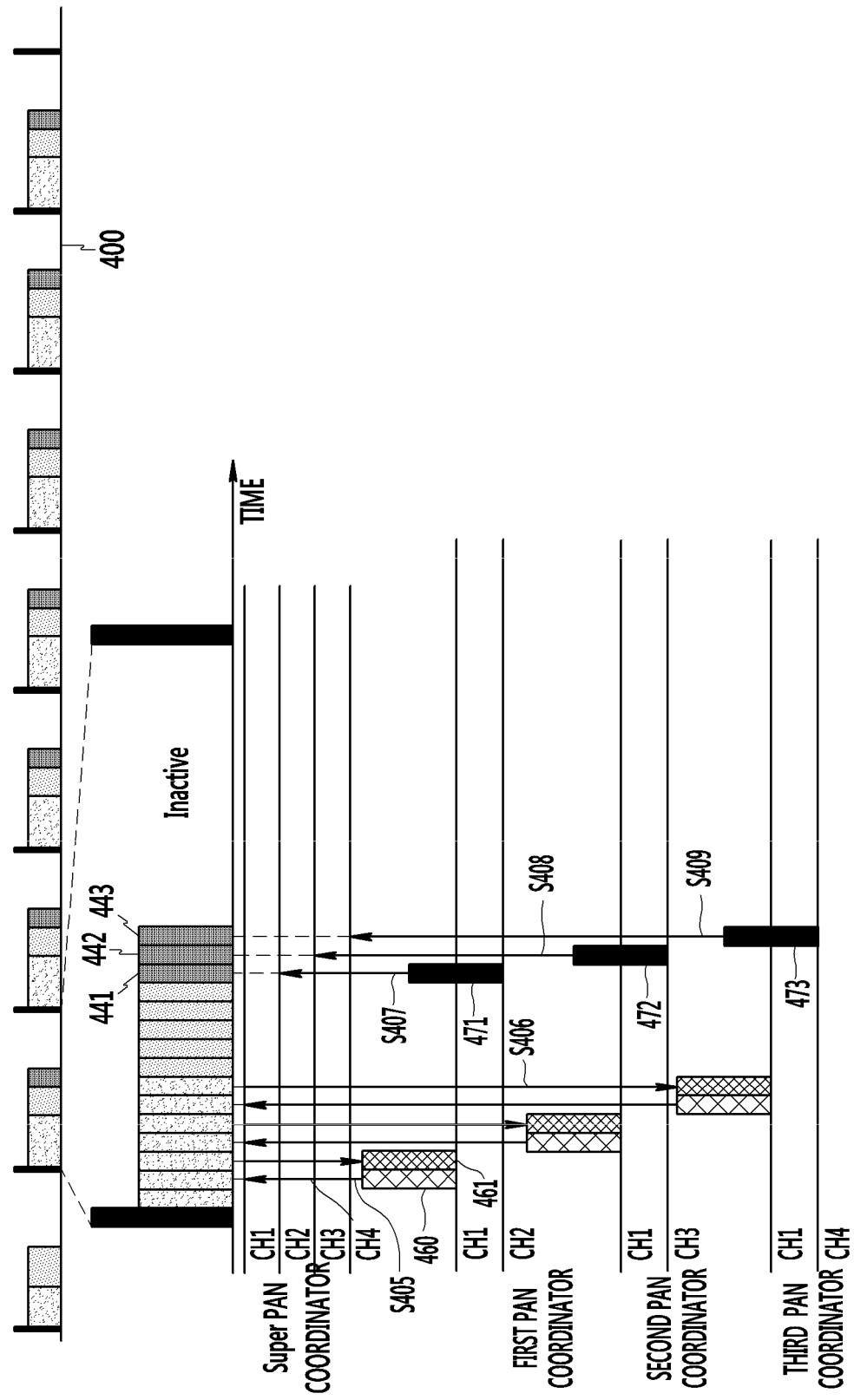

In FIG. 4B, at the DBS 1 441, the super PAN coordinator 110 and the first PAN coordinator 121 make a transition from the channel 1 to the channel 2, and the first PAN coordinator 121 transmits a beacon 471 thereof through the channel 2 and may manage a PAN thereof (S407).

Next, at the DBS 2 442, the super PAN coordinator 110 makes a transmission from the channel 2 to the channel 3 and the second PAN coordinator 122 makes a transition from the channel 1 to the channel 3, and at the DBS 2 442, the second PAN coordinator 122 transmits a beacon 472 thereof through the channel 3 and may manage a PAN thereof (S408).

Next, at the DBS 3 443, the super PAN coordinator 110 makes a transition from the channel 3 to the channel 4, and the third PAN coordinator 123 makes a transition from the channel 1 to the channel 4, transmits a beacon 473 thereof through the channel 4, and may manage a PAN thereof (S409).

Next, after the DBS 3 443, the super PAN coordinator 110 makes a transition from the channel 4 to the channel 1.

Figure 4C:
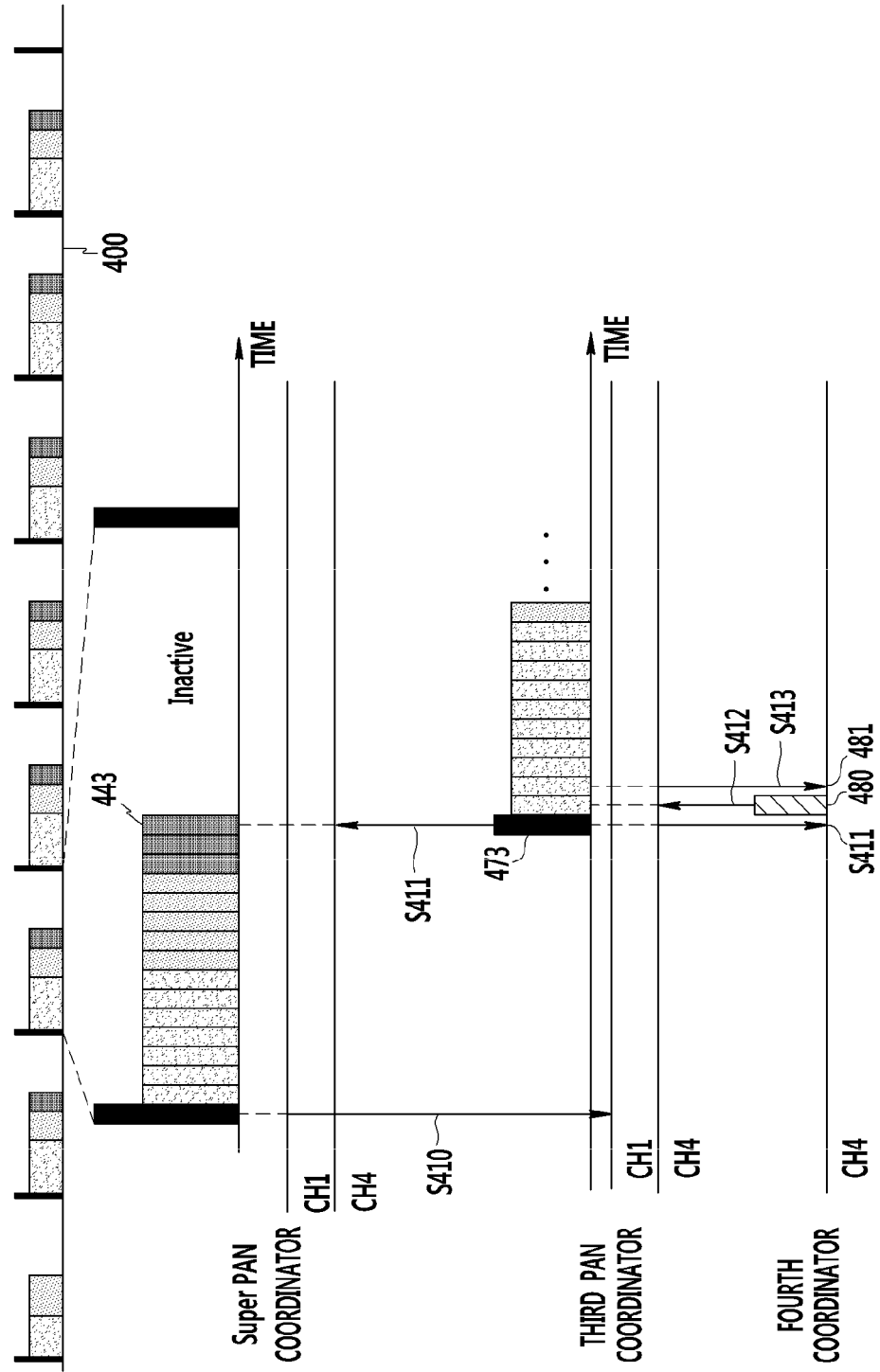

In FIG. 4C, in a next BI, the first, second, and third PAN coordinators 121 to 123 make a transition to the channel 1.

Then, the super PAN coordinator 110 broadcasts the beacon frame through the channel 1 (S410), and the first, second, and third PAN coordinators 121 to 123 receive the beacon frame through the channel 1. Since the first and second PAN coordinators 121 and 122 repeat operations of broadcasting beacons at the DBSs allocated thereto as illustrated in FIG. 4B, the first and second PAN coordinators 121 and 122 are not illustrated in FIG. 4C to FIG. 4E.

At the DBS 3 443, the third PAN coordinator 123 makes a transition from the channel 1 to the channel 4 to broadcast a beacon frame 473 thereof (S411). At this time, a fourth PAN coordinator 124 that newly associates with the network receives the beacon frame 473 through the channel 4.

Then, the fourth PAN coordinator 124 transmits a DBS request command frame 480 to the third PAN coordinator 123 through the channel 4 in the CAP of the third PAN coordinator 123 to request allocation of a channel and a DBS (S412). The third PAN coordinator 123 that receives the DBS request command frame 480 of the fourth PAN coordinator 124 transmits an ACK frame 481 to the fourth PAN coordinator 124 (S413).

Figure 4D:
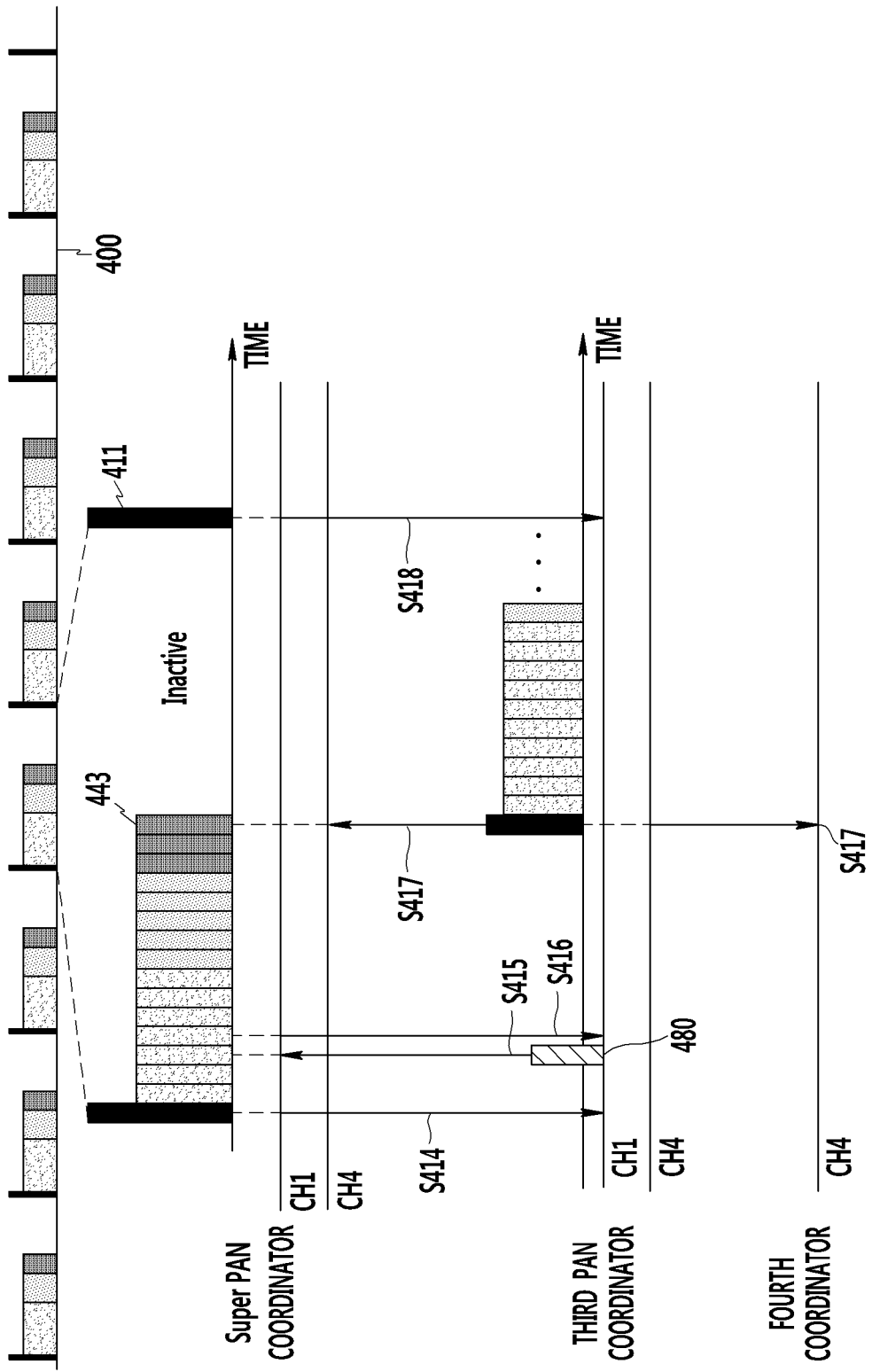

In FIG. 4D, at a next BI, the super PAN coordinator 110 broadcasts the beacon frame through the channel 1, and the first, second, and third PAN coordinators 121 to 123 receive the beacon frame of the super PAN coordinator 110 through the channel 1 (S414).

Next, in the CAP of the super PAN coordinator 110, the third PAN coordinator 123 relays the DBS request frame 480 of the fourth PAN coordinator 124 through the channel 1 to request the super PAN coordinator 110 to allocate a channel and a DBS (S415).

The super PAN coordinator 110 that receives the DBS request frame 480 of the fourth PAN coordinator 124 by the relay of the third PAN coordinator 123 transmits the ACK frame to the third PAN coordinator 123 (S416).

At the DBS 3 443, the third PAN coordinator 123 broadcasts a beacon frame thereof through the channel 4, and the fourth PAN coordinator 124 and the super PAN coordinator 110 receive the beacon frame of the third PAN coordinator 123 through the channel 4 (S417). At a next BI, the super PAN coordinator 110 broadcasts a beacon frame 411 through the channel 1, and the third PAN coordinator 123 receives the beacon frame 411 of the super PAN coordinator 110 through the channel 1 (S418). At this time, the beacon frame 411 broadcasted by the super PAN coordinator 110 may include a TMCTP specification IE informing that a DBS response frame is prepared such as TMCTP frame pending information, number of PAN IDs pending information, and PAN ID list information.

Figure 4E:
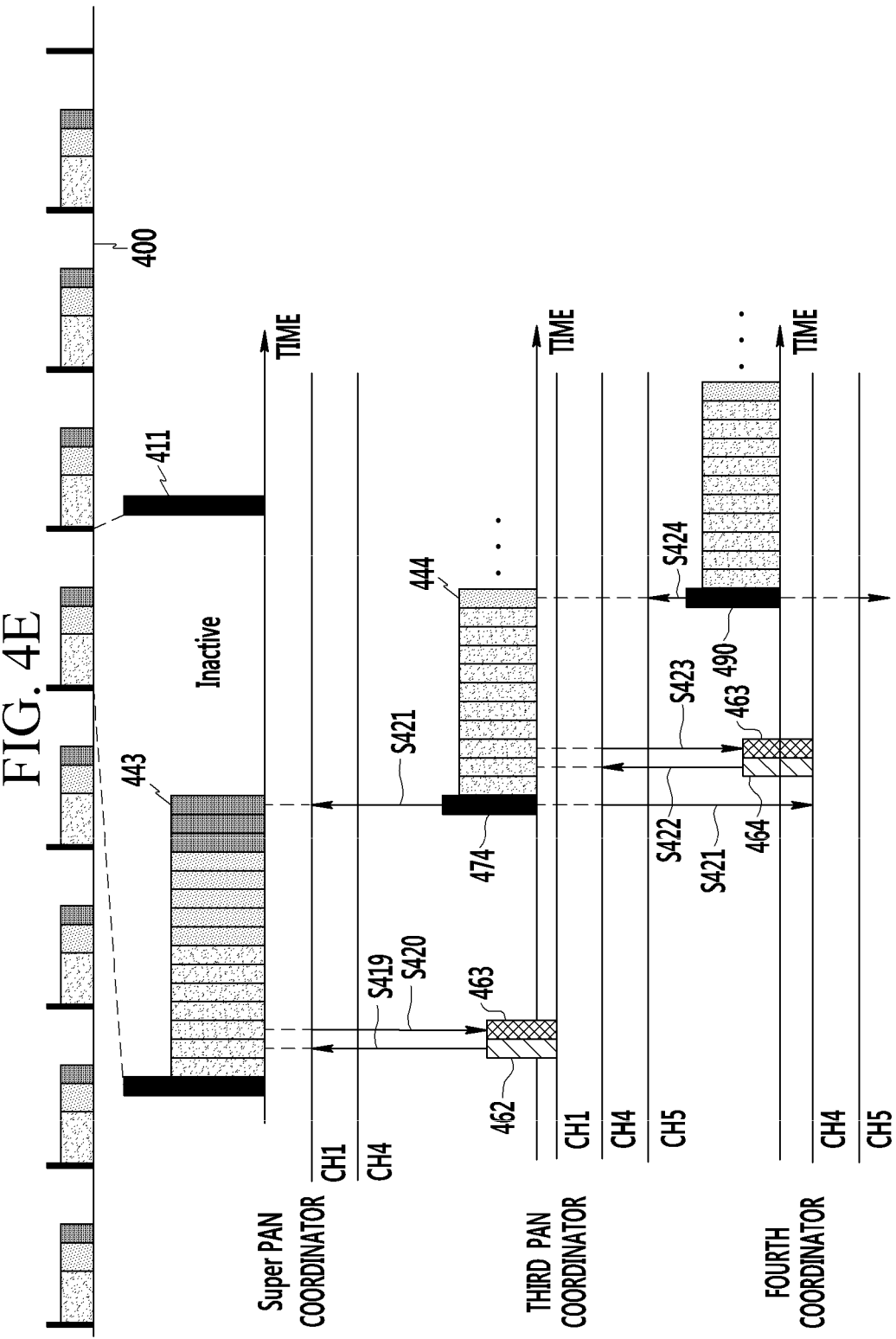

Referring to FIG. 4E, in the CAP of the super PAN coordinator 110, the third PAN coordinator 123 transmits a data request frame 642 through the channel 1 to the super PAN coordinator 110 S419, and receives a DBS response frame 463 from the super PAN coordinator 110 (S420).

At this time, the DBS response frame 463 may include information on a channel and a DBS allocated to the fourth PAN coordinator 124.

Then, the third PAN coordinator 123 broadcasts a beacon frame 474 At the DBS 3 443 of the super PAN coordinator 110 through the channel 4 (S421). At this time, the beacon frame 474 may include the TMCTP specification IE (TMCTP frame pending information, Number of PAN IDs Pending information, and PAN ID list information) informing that the DBS response frame is prepared.

Then, in the CAP of the third PAN coordinator 123 the fourth PAN coordinator 124 transmits a data request frame 464, through the channel 4 to the third PAN coordinator 123 (S422), and receives the DBS response frame 463 from the third PAN coordinator 123 (S423). That is, the third PAN coordinator 123 delays the DBS response frame 463 received from the super PAN coordinator 110 to the fourth PAN coordinator 124.

In the exemplary embodiment of the present invention, a channel 5 and a DBS 444 of the third PAN coordinator 123 may be allocated to the fourth PAN coordinator 124.

Then, the fourth PAN coordinator 124 transmits a beacon frame 490 thereof. At the DBS 444 of the third PAN coordinator 123 through the channel 5 (S424), and may manage a PAN thereof.

FIG. 5 is a flowchart illustrating messages transmitted and received by PAN coordinators, respectively, when a multichannel cluster tree network according to another exemplary embodiment of the present invention is generated.

First, a super PAN coordinator secures a list of available TVWS channels from a GDB through the Internet (S501). The super PAN coordinator may secure the list of the available TVWS channels from a mode I or mode II equipment. Then, the super PAN coordinator maps the available TVWS channels to WPAN PHY channels and selects one of the WPAN PHY channels. The list of the available TVWS channels is secured.

On the other hand, the PAN coordinators scan all the WPAN PHY channels to be prepared to receive beacon frames (S502).

Then, a media access control (MAC) layer management entity (MLME) 512 of the super PAN coordinator broadcasts a beacon frame of the super PAN coordinator to a selected WPAN PHY channel (S503).

A MLME 521 of a PAN coordinator that receives the beacon frame of the super PAN coordinator transmits an MLME-BEACON-NOTIFY.indication primitive to a next higher layer 522 of the PAN coordinator (S504).

The next higher layer 522 of the PAN coordinator analyzes the MLME-BEACON-NOTIFY.indication primitive and transmits an MLME-DBS.request primitive to the MLME 521 thereof (S505).

Then, the MLME 521 of the PAN coordinator transmits a DBS request frame including channel allocation request and DBS request information to the super PAN coordinator (S506).

Next, the MLME 512 of the super PAN coordinator transmits an ACK frame for a DBS request frame to the PAN coordinator (S507). Then, the MLME 512 of the super PAN coordinator transmits an MLME-DBS.indication primitive to a next higher layer 511 of the super PAN coordinator (S508).

Then, in a next BI, the super PAN coordinator transmits a beacon frame to the PAN coordinator (S509). The PAN coordinator that receives the beacon frame of the super PAN coordinator then transmits a data request frame to the super PAN coordinator (S510).

Then, the super PAN coordinator transmits an ACK frame for the data request frame (S511) and transmits a DBS response frame (S512) so that the PAN coordinator may grasp an allocated channel and an allocated DBS.

Next, the PAN coordinator transmits the ACK frame for the DBS response frame to the super PAN coordinator (S513). The MLME 521 of the PAN coordinator then analyzes the DBS response frame of the super PAN coordinator to confirm information on the allocated channel and DBS, and transmits an MLME-DBS.confirm primitive to the next higher layer 522 of the PAN coordinator (S514).

Next, the super PAN coordinator makes a transition at the allocated DBS to the channel allocated to the PAN coordinator and stands by to receive the beacon broadcasted by the PAN coordinator (S515), and the PAN coordinator makes a transition at the allocated DBS to the allocated channel (S516) to broadcast the beacon frame thereof through the allocated channel (S517).

Figure 6:
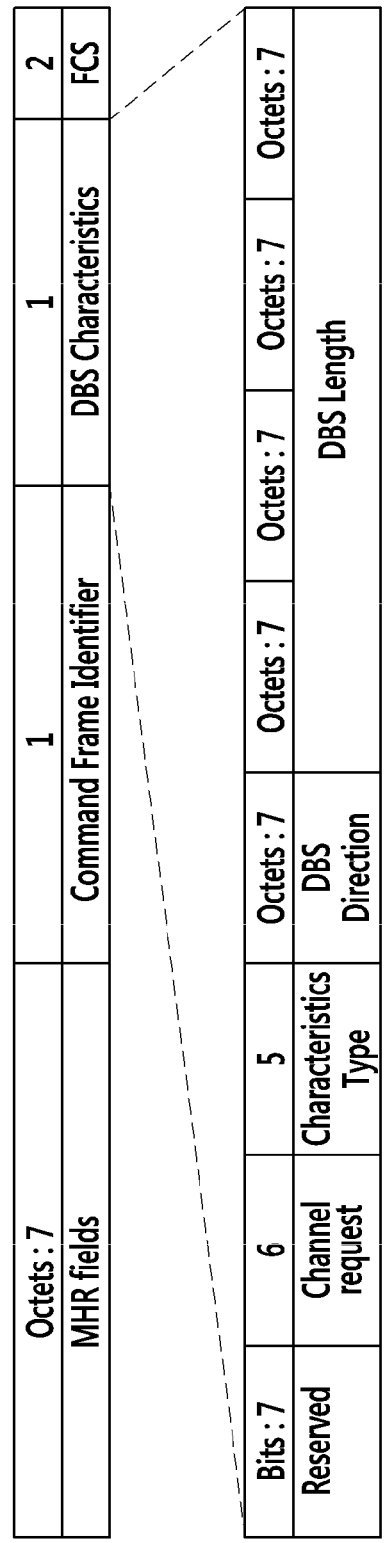
FIG. 6 is a view illustrating a dedicated beacon slot (DBS) request frame according to an exemplary embodiment of the present invention.

FIG. 6 is a view illustrating a DBS request frame according to an exemplary embodiment of the present invention.

Referring to FIG. 6, a DBS request frame according to the exemplary embodiment of the present invention includes a bit that represents whether a channel request exists. In the exemplary embodiment of the present invention, the DBS request frame may use a sixth bit of a DBS characteristic field (1 octet) as a channel request bit.

Figure 7:
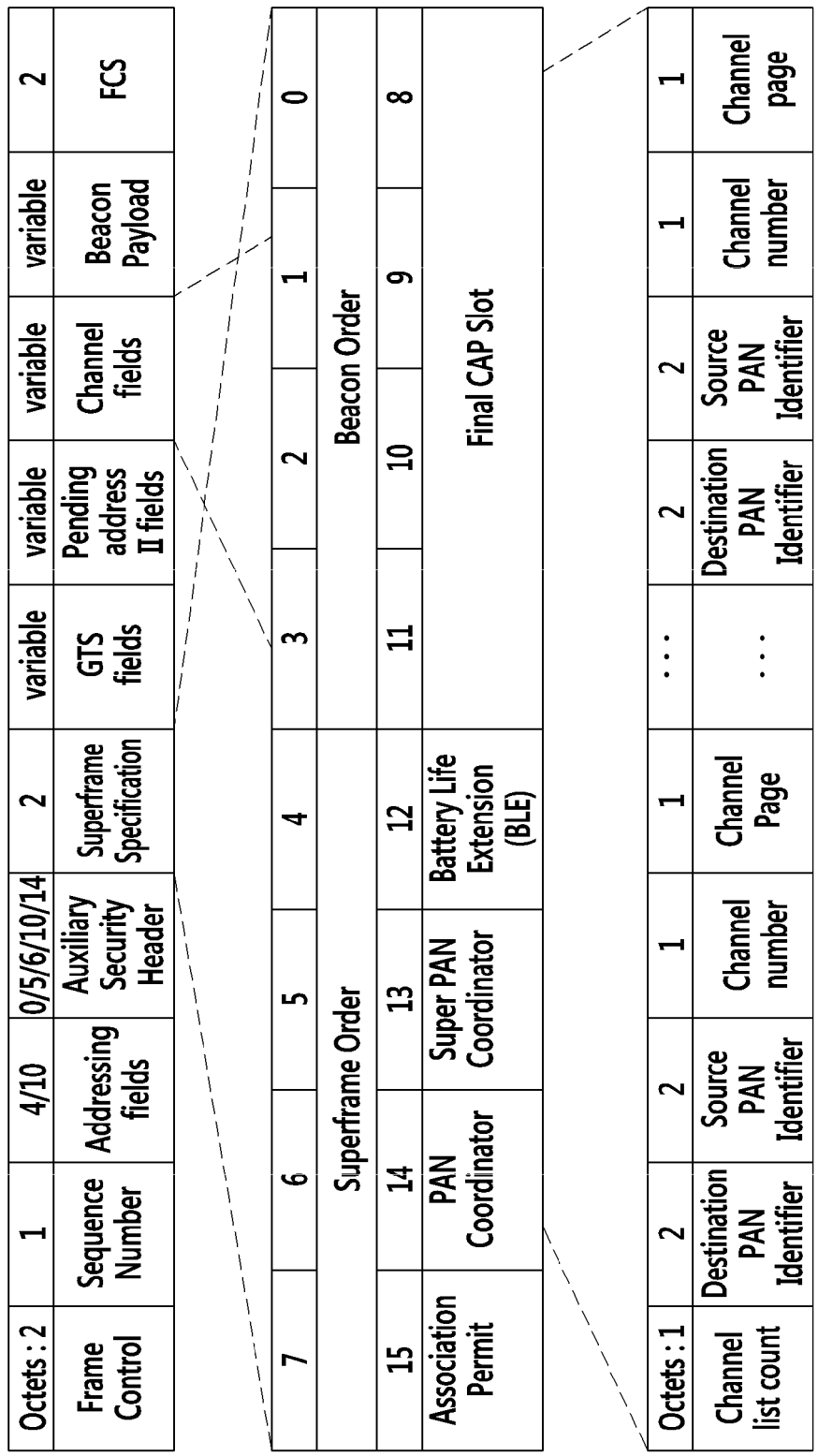
FIG. 7 is a view illustrating a beacon frame according to an exemplary embodiment of the present invention.

FIG. 7 is a view illustrating a beacon frame according to an exemplary embodiment of the present invention.

Referring to FIG. 7, a beacon frame according to the exemplary embodiment of the present invention includes a field that represents channel information.

In the exemplary embodiment of the present invention, the beacon frame may include a 'Channel' field between a 'pending address' field and a 'Beacon Payload' field. At this time, a length of the Channel field may be arbitrarily determined.

The Channel field may include a 'Channel list count' field, a 'Destination PAN Identifier' field, a 'Source PAN Identifier' field, a 'Channel number' field, and a 'Channel page' field. At this time, the Channel list count field, the Destination PAN Identifier field, the Source PAN Identifier field, the Channel number field, and the Channel page field as a cluster may be included in the Channel field, and the Channel field may include a plurality of field clusters.

In the exemplary embodiment of the present invention, the Channel list count field represents the number of allocated channels and has a 1 octet length. That is, the number of field clusters included in the Channel field is the number written in the Channel list count.

In addition, in the exemplary embodiment of the present invention, the Destination PAN Identifier field represents destination PANs of the allocated channels and has a 2 octet length. The Source PAN Identifier field represents starting points PANs of the allocated channels and has a 2 octet length. The Channel number field represents the allocated channels and has a 1 octet length. The Channel page field represents pages of the allocated channels and has a 1 octet length.

In the exemplary embodiment of the present invention, a 'Superframe Specification' field of a beacon frame may include a bit that may represent that a PAN coordinator that broadcasts the beacon frame is the super PAN coordinator. In the exemplary embodiment of the present invention, a $13^{th}$ bit of the Superframe Specification field is set as a bit that represents the super PAN coordinator.

As described above, according to the exemplary embodiment of the present invention, through the super PAN coordinator that manages all networks based on a multi-channel, a PAN capable of avoiding inter-channel interference may be formed. In addition, it is possible to grasp use states of channels used for transmitting and receiving beacon frames, to observe a change in a network topology, and to form an energy efficient PAN.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of generating networks in a wireless personal area network (WPAN), comprising:
   obtaining a list of available TV white space (TVWS) channels;
   mapping the TVWS channels to corresponding physical (PHY) channels;
   selecting one of the PHY channels;
   broadcasting a first beacon frame through the selected PHY channel;
   receiving a dedicated beacon slot (DBS) request frame for requesting allocation of a first channel and a first DBS from a first personal area network (PAN) coordinator among a plurality of PAN coordinators that receive the first beacon frame; and
   allocating the first channel and the first DBS to a second PAN coordinator, wherein the first PAN coordinator is a TVWS multi-channel cluster tree PAN (TMCTP)-parent PAN coordinator and the second PAN coordinator is a TMCTP-child PAN coordinator.

2. The method of claim 1, further comprising:
   receiving a data request frame from the second PAN coordinator; and
   transmitting a DBS response frame including information on the first channel and the first DBS to the second PAN coordinator.

3. The method of claim 2, further comprising receiving a second beacon frame from the second PAN coordinator through the first channel.

4. The method of claim 1, further comprising transmitting a media access control (MAC) layer management entity (MLME)-DBS.indication primitive to a next higher layer of the first PAN coordinator by an MLME of the first PAN coordinator after receiving the DBS request frame.

5. The method of claim 1, wherein the obtaining comprises obtaining the list of available TVWS channels from geolocation database (GDB) through internet.

6. The method of claim 1, wherein the first beacon frame includes TVWS multi-channel cluster tree PAN (TMCTP) specification information entity (IE) that provides information of DBS allocation capability and channel allocation capability.

7. The method of claim 1, wherein the first beacon frame includes TVWS multi-channel cluster tree PAN (TMCTP) specification information entity (IE) that provides at least one information of TMCTP frame pending information, number of PAN IDs pending information, or PAN ID list information.

8. The method of claim 1, wherein the DBS is included in a beacon only period (BOP), and the BOP follow a contention free period in a superframe of the first PAN coordinator and the second PAN coordinator.

9. A method of generating networks in a wireless personal area network (WPAN), comprising:
receiving, at a second personal area network (PAN) coordinator, a first beacon frame broadcasted by a first PAN coordinator through a PHY channel selected by the first PAN coordinator;
transmitting, by the second PAN coordinator, a dedicate beacon slot (DBS) request frame for requesting allocation of a first channel and a first DBS to the first PAN coordinator;
transmitting, by the second PAN coordinator, a data request frame to the first PAN coordinator; and
receiving, by the second PAN coordinator, a DBS response frame including information on the first channel and the first DBS allocated to the second PAN coordinator from the first PAN coordinator, wherein the first PAN coordinator is a TMCTP-parent PAN coordinator and the second PAN coordinator is a TMCTP-child PAN coordinator.

10. The method of claim 9, further comprising transmitting a media access control (MAC) layer management entity (MLME)-BEACON-NOTIFY.indication primitive from an MLME of the second PAN coordinator to a next higher layer of the second PAN coordinator after receiving the first beacon frame.

11. The method of claim 10, further comprising analyzing the MLME-BEACON-NOTIFY.indication primitive and transmitting an MLME-DBS.request primitive from the next higher layer to the MLME.

12. The method of claim 9, further comprising analyzing the DBS response frame to confirm the information on the first channel and the first DBS, and transmitting an MLME-DBS.confirm primitive from the MLME to the next higher layer after receiving the DBS response frame.

13. The method of claim 9, further comprising broadcasting a second beacon frame through the first channel.

14. The method of claim 9, wherein the first beacon frame includes TVWS multi-channel cluster tree PAN (TMCTP) specification information entity (IE) that provides information of DBS allocation capability and channel allocation capability.

15. The method of claim 9, wherein the first beacon frame includes TVWS multi-channel cluster tree PAN (TMCTP) specification information entity (IE) that provides at least one information of TMCTP frame pending information, number of PAN IDs pending information, or PAN ID list information.

16. The method of claim 9, wherein the DBS is included in a beacon only period (BOP), and the BOP follow a contention free period in a superframe of the second PAN coordinator and the first PAN coordinator.

\* \* \* \* \*